United States Patent
Lu et al.

(10) Patent No.: US 8,486,204 B2
(45) Date of Patent: Jul. 16, 2013

(54) HINGE DEVICE AND ELECTRONIC DEVICE USING THE SAME

(75) Inventors: Yu-Chi Lu, Shulin (TW); Yu-Chan Hsieh, Shulin (TW); Shun-Tian Lin, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 359 days.

(21) Appl. No.: 12/948,066

(22) Filed: Nov. 17, 2010

(65) Prior Publication Data

US 2012/0120561 A1    May 17, 2012

(51) Int. Cl.
*C22C 38/58* (2006.01)

(52) U.S. Cl.
USPC .......... 148/327; 420/45; 420/46; 420/47; 420/48; 420/49; 420/50; 420/56; 420/57; 420/58; 420/59; 420/73; 420/74; 420/584.1; 420/585; 420/586; 420/586.1; 420/44

(58) Field of Classification Search
USPC .......... 420/72–75, 44–48, 56–59, 584.1, 420/585, 586, 586.1; 148/327, 329
See application file for complete search history.

(56) References Cited

U.S. PATENT DOCUMENTS

| | | | | |
|---|---|---|---|---|
| 4,851,059 | A | * | 7/1989 | Sumitomo et al. ............ 148/327 |
| 5,098,652 | A | * | 3/1992 | Yasui et al. ..................... 420/45 |
| 2004/0191109 | A1 | * | 9/2004 | Maziasz et al. ................. 420/45 |

FOREIGN PATENT DOCUMENTS

JP           362240749 A  * 10/1987

* cited by examiner

*Primary Examiner* — Deborah Yee
(74) *Attorney, Agent, or Firm* — Alan Kamrath; Kamrath IP Lawfirm, P.A.

(57) ABSTRACT

The hinge is made with a metal injection molding process from an alloy having at least: from 4 to 32 wt % Mn, from 16 to 37 wt % Cr, and from Fe that fills up the rest of the percentage.

9 Claims, 4 Drawing Sheets

HINGE DEVICE AND ELECTRONIC DEVICE USING THE SAME

BACKGROUND OF THE INVENTION

1. Field of the Invention

The present invention relates to a hinge device and to an electronic device using the hinge device.

2. Description of the Prior Art

Terminology

It is well known in the art that elements may be referred to by their names or symbols. The following Table 1 lists names and symbols of elements regarded in the specification and claims of the present invention.

TABLE 1

| Name | Symbol |
| --- | --- |
| Manganese | Mn |
| Chromium | Cr |
| Nickel | Ni |
| Silicon | Si |
| Nitrogen | N |
| Carbon | C |
| Sulfur | S |
| Phosphorus | P |
| Aluminum | Al |
| Cobalt | Co |
| Titanium | Ti |
| Copper | Cu |
| Vanadium | V |
| Tungsten | W |
| Molybdenum | Mo |
| Boron | B |
| Oxygen | O |
| Niobium | Nb |
| Tantalum | Ta |
| Yttrium | Y |
| Lanthanum | La |
| Cerium | Ce |
| Hafnium | Hf |
| Zirconium | Zr |
| Iron | Fe |

A conventional mobile electronic device, for example, a notebook computer, a cell phone or a PDA, comprises a base and a screen, as well as a conventional hinge device connecting and enabling the rotating motion of the screen relative to the base. The manners for rotating the base and the screen include sliding, folding, or a combination of sliding and flipping. The conventional hinge device for use in a sliding-and-flipping electronic device comprises a hinge member and sliding plate. The hinge member comprises two ends, two sliding slots respectively formed at the ends and a pivoting portion. The pivoting portion is attached to the base of the electronic device so that the hinge member may turn pivotally relative to the base. The sliding plate is attached to the screen of the electronic device and is slidably mounted between the two sliding slots. When using the electronic device, the screen can be slid aside to a predetermined position and then can operate as the monitor of the electronic device.

The conventional hinge device is made from 304, 316L or 420L series stainless steels, zinc alloy, and amorphous Zirconic metal or amorphous titanic metal. However, the conventional hinge device made of the aforementioned material has the following shortcomings:

The zinc alloy is a low-strength material and parts made from zinc alloy thus easily abrade away with time so that unwanted gaps are formed between parts that eventually lead to disorder.

Parts made from conventional stainless steels are made directly from steel sheets with a stamping process that forms the parts into designed shapes. However, being limited by the original shape of the stainless steel sheet and the stamping process, there is little freedom in designing the shapes of the parts. Furthermore, 304 and 316L series stainless steels do not provide enduring strength. 420L series stainless steel, though having high strength, is highly ferromagnetic and may interfere with the operation of the electronic device. The saturation induction intensity of the 420L series stainless steel is 200 Gauss, much higher than the 5-10 Gauss of the 304 and 316L series stainless steels. Thus, 420L series stainless steel is not suitable for making a hinge device for use in electronic devices.

Molding processes are necessary for making parts from amorphous metals. Though high in strength and hardness, the molded parts are low in precision and require a further high-precision process to achieve applicable precision. The high-strength and high-hardness of said parts turn out to be obstacles for the high-precision process, and inevitably lead to longer processing time, high wear rate of bits and thus low yield ratio and high cost.

In addition, a conventional hinge device, as shown in Taiwan Utility Model No. M350212, comprises an independent hinge member and an independent sliding plate that are correspondingly operable for fulfilling the aforementioned slide-and-flipping function. However, the independent hinge member and the sliding plate are respectively attached to the body and the screen with fasteners, which increase parts numbers as well as complexity that lead to high manufacturing cost and high assembly cost.

To overcome the shortcomings, the present invention provides a hinge device to mitigate or obviate the aforementioned problems.

SUMMARY OF THE INVENTION

The main objective of the invention is to provide a hinge device and an electronic device using the hinge device.

The hinge in accordance with the present invention is made with a metal injection molding (MIM) process from an alloy having at least: from 4 to 32 wt % Mn, from 16 to 37 wt % Cr, and from Fe that fills up the rest of the percentage.

The hinge device is unified in one integrated part and is structurally, physically and mechanically superior to a conventional hinge device to overcome the shortcomings and to mitigate or obviate the problems of the conventional hinge device.

Preferably, the hinge device has Ni and Cr, whose percentages sum exceed 12%, and, thus, is stainless and has the following features:

Yield strength: 350 MPa.

Tensile strength: 700 MPa.

Elongation percent: 10%.

Hardness: >HRB90.

Saturation induction intensity: <10.0 Gauss (as a non-ferromagnetic stainless steel tested under 500 Oe of induced magnetic field).

The strengths are higher than that of conventional non-ferromagnetic stainless steel or zinc alloy, and the hardness thereof is lower than that of amorphous metal. The hinge device in accordance with the present invention not only provides higher strength and hardness than non-ferromagnetic stainless steel, but also resolves the shortcoming that parts made from amorphous metal are too hard to be processed.

Preferably, the hinge device in accordance with the present invention is made with the aforementioned materials and has an elongated rod and two elongated arms. The rod has two ends, and the two elongated arms are respectively attached to the ends of the rod. Each arm has an upper pivoting end, a lower pivoting end, an upper pivoting hole formed beside the upper pivoting end and a lower pivoting hole axially-parallel with the upper pivoting hole and formed beside the lower pivoting end.

Another aspect of the invention relates to an electronic device having a hinge as described above, a base and a screen. The base has a rod chamber for receiving the rod of the hinge and the two lower chambers for respectively receiving the lower pivoting ends of the two arms of the hinge. Each lower chamber has a pivot mounted in the lower pivoting hole of the arm. The screen has two upper chambers for respectively receiving the upper pivoting ends of the two arms of the hinge. Each upper chamber has a pivot mounted in the upper pivoting hole of the arm.

With the foregoing structure, the present invention provides a hinge device that may be quickly and easily made as a single integrated part with a metal injection molding process. Comparing with a conventional hinge device, said hinge device significantly reduces manufacturing and assembly costs and is easier to make or design.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
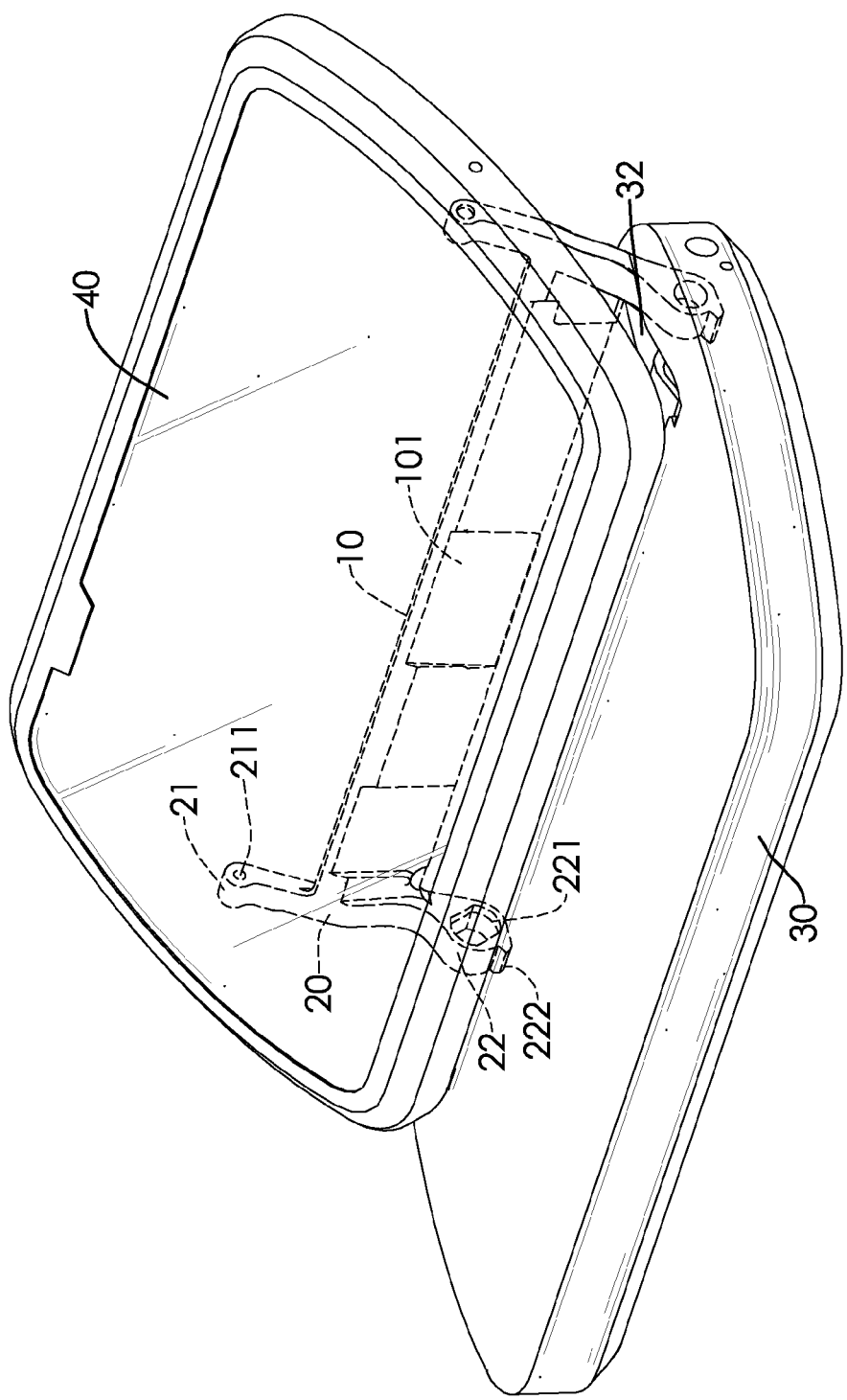
FIG. 1 is a perspective view of an electronic device comprising a hinge device in accordance with the present invention.

The present invention provides a hinge device made with a metal injection molding process from an alloy. The alloy is high-strength, corrosion-resistant and non-ferromagnetic. The following embodiments disclose possible and feasible compositions of the alloy as well as features thereof In the metal injection molding process, a powder of the alloy is mixed with a multiplicity of bonding agents, for example PP, PW, PE, SA and other acceptable bonding agents, to form an injection material. The injection material is then injected, molded, de-oiled and sintered. Relevant details to the metal injection molding process are well known in the art and are thus omitted herein.

The first embodiment of the present invention relates to a hinge device made with a metal injection molding process from an alloy comprising 9 wt % Mn, 16.5 wt % Cr, 9.5 wt % Ni, 3 wt % Si, 0.35 wt % N, 0.2 wt % C, 0.03 wt % S, 0.02 wt % P, 1 wt % Al, 2 wt % Co, 1 wt % Mo, 0.2 wt % O, 0.5 wt % Zr, and Fe that fills up the rest of the percentage.

The hinge device of the first embodiment comprises the following features:
Yield strength: 450 MPa.
Tensile strength: 720 MPa.
Elongation percent: 45%.
Hardness: >HRB90.
Saturation induction intensity: <1.43 Gauss.

The second embodiment of the present invention relates to a hinge device made with a metal injection molding process from an alloy comprising 10.2 wt % Mn, 21 wt % Cr, 1.2 wt % Ni, 2 wt % Si, 0.85 wt % N, 0.2 wt % C, 0.03 wt % S, 0.2 wt % P, 0.3 wt % Al, 2 wt % Co, 0.8 wt % Ti, 0.5 wt % Cu, 2 wt % W, 3 wt % Mo, 0.1 wt % O, 0.7 wt % Ta, and less than 1 wt % Y and Zr, as well as Fe that fills up the rest of the percentage.

The hinge device of the second embodiment comprises the following features:
Yield strength: 620 MPa.
Tensile strength: 790 MPa.
Elongation percent: 25%.
Hardness: >HRC25.
Saturation induction intensity: <4.51 Gauss.

The third embodiment of the present invention relates to a hinge device made with a metal injection molding process from an alloy comprising 30 wt % Mn, 25 wt % Cr, 3 wt % Ni, 0.9 wt % N, 0.2 wt % C, 2 wt % Ti, 0.5 wt % Cu, 4 wt % W, 5 wt % Mo, 0.5 wt % B, 1 wt % Nb, 0.6 wt % Ta, and less than 1 wt % Y, La and Zr, as well as Fe that fills up the rest of the percentage.

The hinge device of the third embodiment comprises the following features:
Yield strength: 560 MPa.
Tensile strength: 750 MPa.
Elongation percent: 38%.
Hardness: >HRC22.
Saturation induction intensity: <2.43 Gauss.

The fourth embodiment of the present invention relates to a hinge device made with a metal injection molding process from an alloy comprising 5 wt % Mn, 30 wt % Cr, 3 wt % Ni, 1.5 wt % Si, 0.4 wt % N, 0.02 wt % C, 0.05 wt % S, 0.03 wt % P, 0.5 wt % Al, 0.5 wt % V, 4 wt % W, 0.8 wt % Nb, 0.6 wt % Ta, and less than 1 wt % La, Ce and Hf, as well as Fe that fills up the rest of the percentage.

The hinge device of the fourth embodiment comprises the following features:
Yield strength: 820 MPa.
Tensile strength: 1150 MPa.
Elongation percent: 12%.
Hardness: >HRC29.
Saturation induction intensity: <7.43 Gauss.

The fifth embodiment of the present invention relates to a hinge device made with a metal injection molding process from an alloy comprising 32 wt % Mn, 16 wt % Cr, 0.7 wt % N, 0.01 wt % C, 4 wt % Mo, 0.9 wt % Nb, 1 wt % Ta, and Fe that fills up the rest of the percentage.

The hinge device of the fifth embodiment comprises the following features:
Yield strength: 600 MPa.
Tensile strength: 850 MPa.
Elongation percent: 22%.
Hardness: >HRC25.
Saturation induction intensity: <3.12 Gauss.

The hardness of a conventional hinge device made from a zinc alloy metal is about HRB30, with a yield strength of only 100 MPa. The hardness of a 304 or 316 stainless steel is between HRB55 and HRB70, and the hardness of a conventional hinge device made from said stainless steel is about HRB55 to HRB60. The yield strength of the conventional hinge device made from said stainless steel is only about 160 MPa and is vulnerable to abrasion and deformation. The hardness of a conventional hinge made from an amorphous metal is higher than HRC66 and so causes difficulty in further processing and a longer processing time.

It is apparent that the hardness of the hinge device in accordance with the present invention is higher than that of a conventional hinge device made from zinc alloy and lower than that of a conventional hinge device made from amorphous metal. The hinge device in accordance with the present invention not only provides higher strength and hardness than non-ferromagnetic stainless steel, but also resolves the shortcoming that parts made from amorphous metal are too hard to be processed. Furthermore, the hinge device in accordance with the present invention provides higher strength than conventional counterparts made from 304 or 316 stainless steels.

In addition, the hinge device in accordance with the present invention is made with a metal injection molding process to form complex shapes and to provide high precision. On the contrary, conventional hinge devices, either made with stamping process from 304 or 316 stainless steels or with molding process from amorphous metal, fail to be bulk manufactured with high precision into 3D shapes. A conventional hinge device made from zinc alloy with liquid metal injection molding fails to provide sufficient strength for being used as a hinge or a power-transmitting part.

Figure 2:
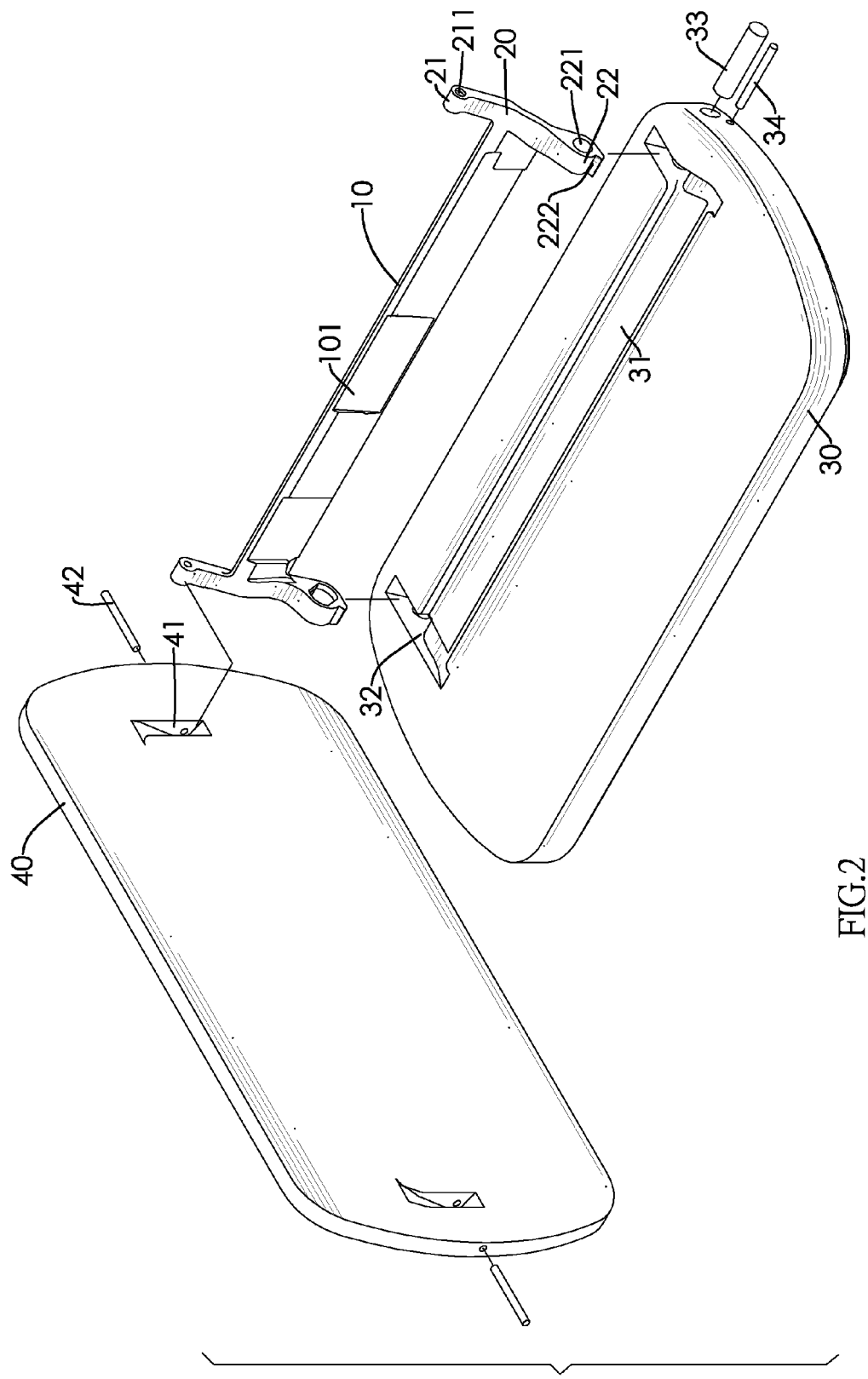
FIG. 2 is an exploded perspective view of the electronic device in FIG. 1.

Preferably, with reference to FIGS. 1 and 2, the hinge device in accordance with the present invention may be made with the aforementioned materials for being mounted in an electronic device that has a base 30 and a screen 40, to allow the screen 40 to flip relative to the base 30. The structure of a hinge device for use as aforementioned belongs to the ordinary skill in the art, and, thus, details thereof are omitted herein. Following is an example intended for illustrating said structure and is not in any way intended to limit the scope of the present invention.

The hinge device in accordance with the present invention, made with a metal injection molding process as described above may comprise an elongated rod 10 and two elongated arms 20. The rod 10 has two ends and at least one receiving space 101. The two elongated arms 20 are respectively attached to the ends of the rod 10. Each arm has an upper pivoting end 21, a lower pivoting end 22, an upper pivoting hole 211 formed beside the upper pivoting end 21 and a lower pivoting hole 221 axially-parallel with the upper pivoting hole 211 and formed beside the lower pivoting end 22.

Figure 3:
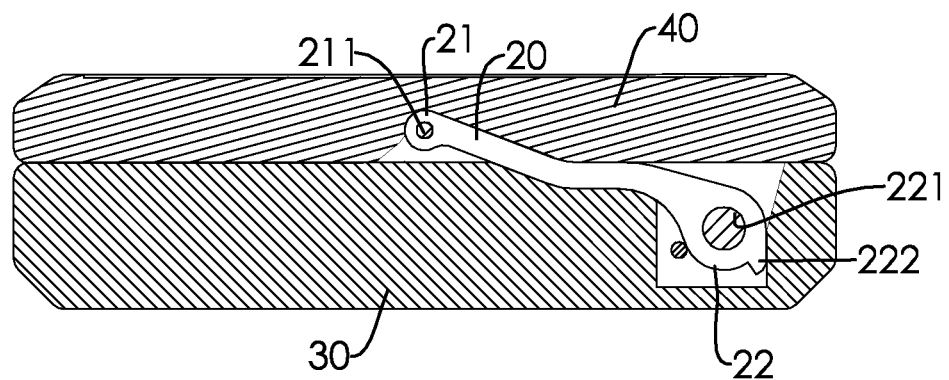
FIG. 3 is a side view in partial section of the electronic device in FIG. 1.
Figure 4:
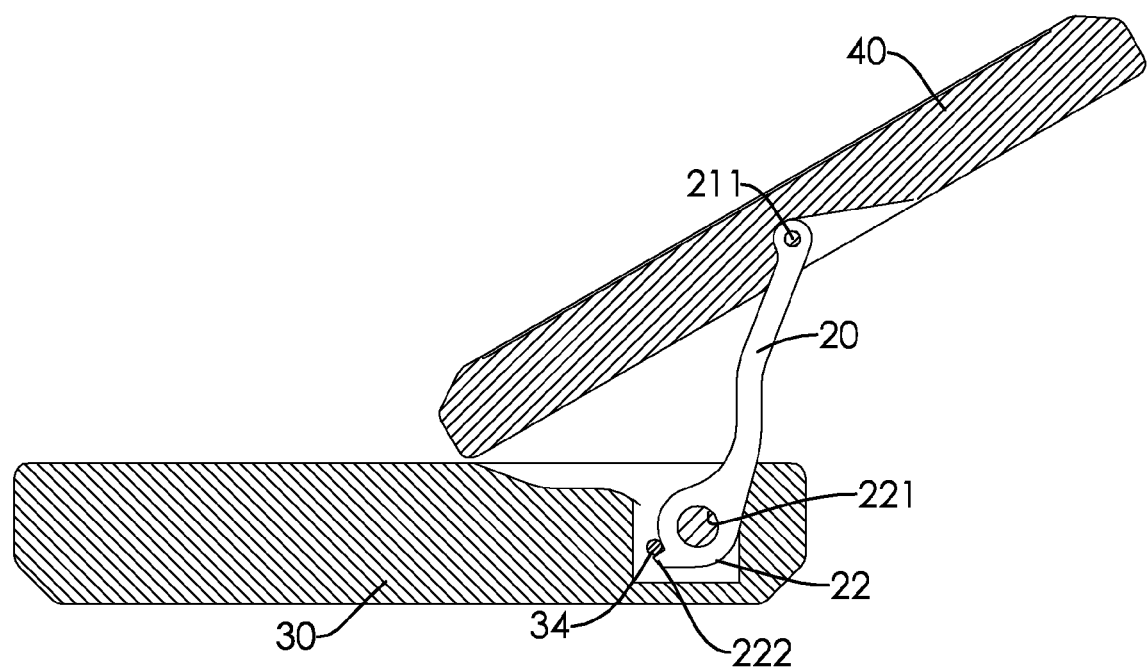
FIG. 4 is another side view in partial section of the electronic device in FIG. 1.

With reference to FIGS. 3 and 4, an electronic device related to the present invention comprises a hinge device, a base 30 and a screen 40.

The hinge device comprises a rod 10, two arms 20, as described above, and further has a positioning protrusion 222.

The base 30 comprises a rod chamber 31 for receiving the rod 10 of the hinge device, two lower chambers 32 for respectively receiving the lower pivoting ends 22 of the two arms 20 of the hinge device, and a stopper 34. Each lower chamber 32 comprises a pivot 33 mounted in the lower pivoting hole 221 of the arm 20. The stopper 34 is mounted in the lower chamber 32 and apart from the pivot 33 of the lower chamber 32.

The screen 40 comprises two upper chambers 41 for respectively receiving the upper pivoting ends 21 of the two arms 20 of the hinge device. Each upper chamber 41 comprises a pivot 42 mounted in the upper pivoting hole 211 of the arm 20.

The positioning protrusion 222 protrudes outward from the lower pivoting end 22 for selectively engaging the stopper 34 when the arms 20 rotate relative to the base 30.

Preferably, the rod 10 of the hinge device further comprises at least one receiving space 101 for receiving electronic parts or members.

With further reference to FIGS. 3 and 4, with the above-disclosed structure, when the screen 40 is rotated to a closed position to contact the base 30, the rod 10 is received in the rod chamber 31 of the base 30. The upper pivoting ends 21 and lower pivoting ends 22 of the arms 20 are respectively received in the upper chambers 41 of the screen 40 and the lower chambers 32 of the base 30. In order to slide and flip the screen 40, first, the fore end of the screen 40 is pushed to slide the screen 40 and in turn pull the arms 20 of the hinge device to rotate relative to the lower pivoting ends 22. When the arms 20 rotate to a predetermined angle, the two arms 20 respectively abut the walls of the lower chambers 32 and the positioning protrusion 222 is stopped by the stopper 34, the upper pivoting ends 21 of the arms 20 point outward and stand the screen 40 up for flipping.

The hinge device in accordance with the present invention may be unified into an integrated part, which, compared with conventional hinge devices, is structurally simple, non-ferromagnetic, corrosion-resistant, and provides suitable strength and hardness. The hinge device in accordance with the present invention is suitable to be manufactured with a metal injection molding process to provide high precision and a smooth surface and reduce cost and time-consumption required for conventional counterparts.

What is claimed is:

1. A hinge device made with a metal injection molding process from an alloy comprising:
   9 wt % Mn;
   16.5 wt % Cr;
   9.5 wt % Ni;
   3 wt % Si;
   0.35 wt % N;
   0.2 wt % C;
   0.03 wt % S;
   0.02 wt % P;
   1 wt % Al;
   2 wt % Co;
   from 0 to 4 wt % Ti;
   from 0 to 2 wt % Cu;
   from 0 to 0.5 wt % V;
   from 0 to 5 wt % W;
   1 wt % Mo;
   from 0 to 1 wt % B;
   0.2 wt % O;
   from 0 to 2 wt % Nb;
   from 0 to 1 wt % Ta;
   0.5 wt % Zr; and
   a balance being Fe.

2. A hinge device made with a metal injection molding process from an alloy comprising:
   10.2 wt % Mn;
   21 wt % Cr;
   1.2 wt % Ni;
   2 wt % Si;
   0.85 wt % N;
   0.2 wt % C;
   0.03 wt % S;
   0.2 wt % P;
   0.3 wt % Al;
   2 wt % Co;
   0.8 wt % Ti;
   0.5 wt % Cu;
   from 0 to 0.5 wt % V;
   2 wt % W;
   3 wt % Mo;
   from 0 to 1 wt % B;
   0.1 wt % O;

from 0 to 2 wt % Nb;
0.7 wt % Ta;
less than 1 wt % Y and Zr; and
a balance being Fe.

3. A hinge device made with a metal injection molding process from an alloy comprising:
30 wt % Mn;
25 wt % Cr;
3 wt % Ni;
from 0 to 4.5 wt % Si;
0.9 wt % N;
0.2 wt % C;
from 0 to 0.5 wt % S;
from 0 to 0.5 wt % P;
from 0 to 1 wt % Al;
from 0 to 5 wt % Co;
2 wt % Ti;
0.5 wt % Cu;
from 0 to 0.5 wt % V;
4 wt % W;
5 wt % Mo;
0.5 wt % B;
from 0 to 0.4 wt % O;
1 wt % Nb;
0.6 wt % Ta;
less than 1 wt % Y, La and Zr; and
a balance being Fe.

4. The hinge device as claimed in claim 1, further comprising
an elongated rod comprising
two ends; and
two elongated arms respectively attached to the two ends of the elongated rod, wherein each elongated arm comprises
an upper pivoting end;
a lower pivoting end;
an upper pivoting hole formed beside the upper pivoting end; and
a lower pivoting hole axially-parallel with the upper pivoting hole and formed beside the lower pivoting end.

5. The hinge device as claimed in claim 4, wherein each of the two elongated arms further comprises
a positioning protrusion protruding outward from the lower pivoting end.

6. The hinge device as claimed in claim 4, wherein the elongated rod further comprises
at least one receiving space.

7. An electronic device comprising
a hinge device as claimed in claim 4;
a base comprising
a rod chamber for receiving the elongated rod of the hinge device; and
two lower chambers for respectively receiving the lower pivoting ends of the two elongated arms of the hinge device and each lower chamber comprises
a pivot mounted in the lower pivoting hole of the elongated arm; and
a screen comprising
two upper chambers for respectively receiving the upper pivoting ends of the two elongated arms of the hinge device, wherein each upper chamber comprises
a pivot mounted in the upper pivoting hole of the elongated arm.

8. The electronic device as claimed in claim 7, wherein
the base further comprises
a stopper mounted in the lower chamber and apart from the pivot of the lower chamber; and
the hinge device further comprises
a positioning protrusion protruding outward from the lower pivoting end for selectively engaging the stopper when the two elongated arms rotate relative to the base.

9. The electronic device as claimed in claim 7, wherein the elongated rod of the hinge device further comprises
at least one receiving space.

* * * * *